(12) United States Patent
Puckett et al.

(10) Patent No.: US 11,125,935 B2
(45) Date of Patent: Sep. 21, 2021

(54) OPTICAL STRUCTURE FOR IMPARTING A DISTRIBUTED PHASE SHIFT TO AN OPTICAL SIGNAL, ELECTRO-OPTIC MODULATOR INCORPORATING SUCH STRUCTURE FOR REDUCED SIZE, LOW SIGNAL LOSS, AND HIGH EXTINCTION RATIO, AND RELATED SYSTEM AND METHOD

(71) Applicant: Honeywell International Inc., Morris Plains, NJ (US)

(72) Inventors: Matthew Wade Puckett, Scottsdale, AZ (US); Neil A. Krueger, Saint Paul, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/298,969

(22) Filed: Mar. 11, 2019

(65) Prior Publication Data
US 2020/0295422 A1 Sep. 17, 2020

(51) Int. Cl.
*H01P 1/18* (2006.01)
*G02B 6/02* (2006.01)
*G02F 1/025* (2006.01)
*G02B 6/293* (2006.01)

(52) U.S. Cl.
CPC ......... *G02B 6/02085* (2013.01); *G02F 1/025* (2013.01); *G02B 6/29328* (2013.01); *G02F 2201/307* (2013.01); *H01P 1/182* (2013.01)

(58) Field of Classification Search
None
See application file for complete search history.

(56) References Cited

U.S. PATENT DOCUMENTS

| | | | | |
|---|---|---|---|---|
| 4,618,214 A | * | 10/1986 | Horwitz | G02B 5/1857 359/569 |
| 4,885,231 A | * | 12/1989 | Chan | G03F 7/001 430/321 |
| 5,581,642 A | | 12/1996 | Deacon et al. | |
| 6,314,220 B1 | * | 11/2001 | Mossberg | G02B 5/1819 359/558 |
| 6,594,421 B1 | * | 7/2003 | Johnson | G02F 1/011 385/1 |
| 6,693,923 B2 | * | 2/2004 | Kringlebotn | H01S 3/0675 372/6 |
| 6,937,638 B2 | * | 8/2005 | Fish | B82Y 20/00 359/369 |

(Continued)

OTHER PUBLICATIONS

Sun et al. Uniformly spaced Lamda/4-shifted Bragg grating array with wafer-scale CMOS-compatible process, Oct. 15, 2013, Optics Letters, vol. 38, No. 20, pp. 4002-4004 (Year: 2013).*

(Continued)

*Primary Examiner* — Ryan A Lepisto
*Assistant Examiner* — Erin D Chiem
(74) *Attorney, Agent, or Firm* — Fogg & Powers LLC

(57) ABSTRACT

An embodiment of an optical structure includes a core having first and second ends and a first side with a first grating profile having a first phase shift distributed between the first and second ends, and a cladding disposed around the core. Such an optical structure can be used in an electro-optic modulator (EOM), and can render the EOM smaller in size than currently available EOMs.

17 Claims, 11 Drawing Sheets

(56) References Cited

U.S. PATENT DOCUMENTS

| | | | | |
|---|---|---|---|---|
| 6,970,621 | B1* | 11/2005 | Fried | G02B 6/10 |
| | | | | 385/11 |
| 7,039,260 | B2* | 5/2006 | Nishiki | G02B 6/12007 |
| | | | | 385/10 |
| 7,130,124 | B2* | 10/2006 | Ketterson | G02B 5/1861 |
| | | | | 359/569 |
| 7,532,384 | B2 | 5/2009 | Bermel et al. | |
| 8,295,654 | B1 | 10/2012 | Efimov | |
| 9,594,198 | B2* | 3/2017 | Lefebvre | G02B 5/1876 |
| 10,012,535 | B2* | 7/2018 | Huang | G01J 3/1804 |
| 10,539,723 | B2* | 1/2020 | Iazikov | G02B 5/1861 |
| 10,732,351 | B2* | 8/2020 | Colburn | G02B 6/124 |
| 10,818,499 | B2* | 10/2020 | Hautala | G02B 6/0015 |
| 2002/0150334 | A1 | 10/2002 | Richardson et al. | |
| 2004/0218638 | A1* | 11/2004 | Carter | H01S 5/06256 |
| | | | | 372/20 |
| 2005/0089257 | A1 | 4/2005 | Barrios et al. | |
| 2005/0133698 | A1 | 6/2005 | Oniki et al. | |
| 2005/0152645 | A1* | 7/2005 | Durkin | G02B 6/0208 |
| | | | | 385/37 |
| 2005/0238079 | A1* | 10/2005 | Botez | H01S 5/42 |
| | | | | 372/96 |
| 2010/0322558 | A1* | 12/2010 | Ogawa | G02B 6/124 |
| | | | | 385/37 |
| 2010/0322559 | A1 | 12/2010 | Ogawa et al. | |
| 2010/0329608 | A1 | 12/2010 | Ogawa et al. | |
| 2015/0185256 | A1* | 7/2015 | Fujinoki | A61B 5/0059 |
| | | | | 324/96 |
| 2017/0059799 | A1 | 3/2017 | Gupta et al. | |
| 2017/0170631 | A1 | 6/2017 | Chimot et al. | |
| 2017/0317471 | A1 | 11/2017 | Lor et al. | |
| 2018/0059328 | A1 | 3/2018 | Shi | |
| 2019/0227350 | A1 | 7/2019 | Puckett et al. | |

OTHER PUBLICATIONS

Hukriede et al., Fabrication and application of holographic Bragg gratings in lithium niobate channel waveguides, Jan. 15, 2003, Journal of Physics D: Applyied Physics vol. 36, p. R1-R16 (Year: 2003).*

Fink, "Thesis presented to the Faculty of The Graduate College at the University of Nebraska, "Ultrasonic Detection Using Π-Phase-Shifted Fiber Bragg Gratings"", "http://digitalcommons.unl.edu/elecengtheses/44", Dated Nov. 2012, pp. Cover, 2-51.

Verber, "Applications of Electro-Optic Gratings in Integrated Optical Signal Processing Devices", "https://ntrs.nasa.gov/search.jsp?R=19820008037 2018-03-09T15:12:41+00:00Z", Retrieved Mar. 9, 2018, pp. 209-215.

Wang et al, "Nanophotonic Lithium Niobate Electro-optic Modulators", "Optics Express", Dated Jan. 22, 2018, pp. 1547-1555, vol. 26, No. 2, Publisher: Optical Society of America.

Wooten et al, "A Review of Lithium Niobate Modulators for Fiber-Optic Communications Systems", "IEEE Journal of Selected Topics in Quantum Electronics", Dated Jan./Feb. 2000, pp. 69-82, vol. 6, No. 1, Publisher: IEEE.

Ying et al, "Ultra-smooth Lithium Niobate Photonic Microstructures by Surface Tension Reshaping", "Optics Express", Dated May 24, 2010, pp. 11508-11513, vol. 18, No. 11, Publisher: Optical Society of America.

Zhang et al, "Monolithic Ultra-high-Q Lithium Niobate Microring Resonator", "Optica", Dated Dec. 2007, pp. 1536-1537, vol. 4, No. 12, Publisher: Optical Society of America.

United States Patent and Trademark Office, "Restriction Requirement", From U.S. Appl. No. 15/956,610, dated Feb. 7, 2019, pp. 1-6, Published: US.

U.S. Patent and Trademark Office, "Notice of Allowance", U.S. Appl. 15/956,610, dated Mar. 15, 2019, pp. 1-15, Published: US.

U.S. Patent and Trademark Office, "Notice of Allowance", U.S. Appl. No. 15/956,610, dated Feb. 12, 2020, pp. 1-14, Published: US.

European Patent Office, "Extended European Search Report from EP Application No. 19152416.4 dated Jun. 19, 2019", from Foreign Counterpart to U.S. Appl. No. 15/956,610, pp. 1-8, Published: EP.

U.S. Patent and Trademark Office, "Office Action", U.S. Appl. No. 15/956,610, dated Sep. 19, 2019, pp. 1-10, Published: US.

* cited by examiner

OPTICAL STRUCTURE FOR IMPARTING A DISTRIBUTED PHASE SHIFT TO AN OPTICAL SIGNAL, ELECTRO-OPTIC MODULATOR INCORPORATING SUCH STRUCTURE FOR REDUCED SIZE, LOW SIGNAL LOSS, AND HIGH EXTINCTION RATIO, AND RELATED SYSTEM AND METHOD

CROSS-RELATED APPLICATION

This patent application is related to U.S. patent application Ser. No. 15/956,610, which was filed 18 Apr. 2018, which is titled APPARATUSES AND METHODS FOR LOW ENERGY DATA MODULATION, and which is incorporated by reference.

SUMMARY

FIG. 1 is a diagram of a binary optical switch 10, which is configured to convert a differential electrical binary signal to a differential optical binary signal. The switch 10 is a three-port device that includes an input port 12 configured to receive an optical signal having a free-space wavelength (e.g., 1550 nanometers (nm)), an optical-signal circulator 14 having circulator nodes 16, 18, and 20, a signal-coupled port 22, a signal output port 24, and an electro-optic modulator (EOM) 26, which includes differential-electrical-binary-signal input nodes $28_a$ and $28_b$, an optical-signal input node 30, and an optical-signal output node 32.

Ideal operation of the binary optical switch 10 is as follows.

The node 16 of the circulator 14 receives, via the input port 12, an optical signal having a stable free-space wavelength $\lambda_0$, e.g., 1550 nm, from a signal source such as a tuned cavity laser (not shown in FIG. 1).

The circulator 14 couples the optical signal from the node 16 to the optical input node 30 of the EOM 26 via the circulator node 18.

In response to a differential electrical binary data signal across the input nodes $28_a$ and $28_b$ having a first "on" or transmissive logic level, e.g., a logic 1, the EOM 26 passes the optical signal, with zero loss and zero attenuation, to an output detector of a remote circuit (not shown in FIG. 1) via the EOM output node 32 and the switch output port 24. In more detail, the first transmissive-logic-level data signal generates, across the EOM 26, a first voltage that causes the EOM to have a resonant wavelength equal to the wavelength $\lambda$ of the optical signal in the EOM material. Said another way, the first-transmissive-logic-level data signal generates, across the nodes $28_a$ and $28_b$ of the EOM 26, a first voltage that causes the optical signal to excite a resonant mode (a low, ideally zero, impedance mode) of the EOM. The resonating EOM 26, therefore, acts as a pass-band filter having a narrow pass band aligned with the wavelength of the optical signal such that the EOM passes the optical signal from the input node 30 to the output node 32 with no attenuation.

In response to detecting the optical signal from the output port 24, detecting no optical signal (e.g., a zero-energy or zero-amplitude optical signal) from the signal-coupled port 22, or both detecting the optical signal from the output port 24 and detecting no optical signal from the signal-coupled port 22 (this latter mode of operation is a differential mode of operation), the remote output detector (not shown in FIG. 1) detects the first logic level (e.g., a logic 1), which is the same logic level as represented by the electrical binary data signal across the input nodes $28_a$ and $28_b$.

Conversely, in response to a differential electrical data signal across the input nodes $28_a$ and $28_b$ having a second "off" or blocking logic level, e.g., a logic 0, the EOM 26 blocks the optical signal from the output detector of the remote circuit (not shown in FIG. 1). In more detail, the second-blocking-logic-level data signal generates, across the EOM 26, a second voltage that causes the EOM to have a resonant wavelength that is not equal to the wavelength $\lambda$ of the optical signal in the EOM material. Said another way, the second-blocking-logic-level data signal generates, across the input nodes $28_a$ and $28_b$ of the EOM 26, a second voltage that does not cause the optical signal to excite a resonant mode of the EOM. The non-resonating EOM 26, therefore, acts as a pass-band filter that blocks the optical signal from passing from the input node 30 to the output node 32. That is, the differential electrical binary data signal having the second logic level shifts the narrow pass band of the EOM 26 away from the wavelength $\lambda$ of the optical signal in the EOM.

By completely blocking the optical signal, the EOM 26 redirects all of the energy of the optical signal from the input node 30 back to the node 18 of the circulator 14, which further redirects the optical signal to the output detector (not shown in FIG. 1) via the circulator node 20 and the signal-coupled port 22 of the switch 10.

In response to detecting an optical signal from the signal-coupled port 22, detecting no optical signal (e.g., a zero-energy or zero-amplitude optical signal) from the output port 24, or both detecting the optical signal from the signal-coupled port 22 and detecting no optical signal from the output port 24 (this latter mode of operation is a differential mode of operation), the remote output detector (not shown in FIG. 1) detects the second logic level (e.g., a logic 0), which is the same logic level as represented by the differential electrical data signal across the input nodes $28_a$ and $28_b$.

In summary, the switch 10 ideally directs all of the energy of the optical signal to the port 24 and no energy of the optical signal to the port 22 in response to the signal across the nodes $28_a$ and $28_b$ having a first transmissive voltage that represents a first logic level, and the switch ideally directs all of the energy of the optical signal to the port 22 and no energy of the optical signal to the port 24 in response to the signal across the nodes $28_a$ and $28_b$ having a second blocking voltage that represents a second logic level.

Still referring to FIG. 1, because operation of the switch 10 is, in actuality, non-ideal, a parameter, called the extinction ratio, is defined to indicate how well the EOM 26 passes and blocks an optical signal in response to respective logic levels. The numerator of the extinction ratio is the power of the optical signal at the output port 24 in response to a transmissive logic level (e.g., a logic 1) that causes the EOM 26 to pass the optical signal, and the denominator of the extinction ratio is the power of the optical signal at the output port 24 in response to a blocking logic level (e.g., logic 0) that causes the EOM to block the optical signal. Therefore, for an ideal switch 10, the extinction ratio is infinity (zero denominator), and for an actual, non-ideal, switch 10, the higher the extinction ratio the better. Similarly, an extinction ratio can be defined for the signal-coupled port 22, where the numerator of the extinction ratio is the power of the optical signal at the signal-coupled port 22 in response to a blocking logic level (e.g., a logic 0) that causes the EOM 26 to block the optical signal, and the denominator of the extinction ratio is the power of the optical signal at the signal-coupled port in response to a transmissive logic level (e.g., logic 1) that causes the EOM to pass the optical signal.

Referring to FIG. 2, a π Phase Shift Bragg resonator 34 can be used for the EOM 26 of FIG. 1. The resonator 34 includes a core 36 having sides $38_a$ and $38_b$ each having a grating profile 40, and electrodes $28_a$ and $28_b$. The core 36 of the resonator 34 is formed from two Bragg reflectors $41_a$ and $41_b$ abutting each other and each having a respective end that forms a respective end $42_a$ and $42_b$ of the core. And the resonator 34 includes a cladding material (not shown in FIG. 2) disposed around the core. The combination of the core 36 and the cladding material forms an optical structure.

FIG. 3 is a plot 44 of the grating profile 40 versus position along the core 36 of FIG. 2.

FIG. 4 is a plot 46 of normalized reflection at an input node of the Bragg resonator 34 of FIG. 2 versus the free-space wavelength of an optical signal at an input node (e.g., the optical input node 30 of FIG. 1) of the resonator.

Referring to FIG. 2, in operation, a first transmissive voltage (representing, e.g., a logic 1) across the electrodes $28_a$ and $28_b$ of the Bragg resonator 34 changes an index of refraction $\eta_{effective}$ of the optical structure formed by the core 36 and the cladding (not shown in FIG. 2) such that the transmissive resonant wavelength λ of the Bragg resonator is the same, or approximately the same, as the wavelength, in the optical structure, of an optical signal coupled to an input node of the core such that the Bragg resonator passes the optical signal. As is known, the wavelength λ of an optical signal in a medium other than free space is generally given by the following equation:

$$\lambda = \lambda_0 / \eta_{material} \quad (1)$$

where $\lambda_0$ is the wavelength of the optical signal in free space and $\eta_{material}$ is the index of refraction of the material at the frequency of the optical signal (i.e., $\eta_{material}$ is the index of refraction of the waveguide mode excited by the optical signal). And the effective index of refraction $\eta_{effective}$ of the optical structure formed by the core 36 and cladding accounts for a shift in $\eta_{material}$ effectively caused by the wavelength $\lambda_0$, by the geometry (e.g., shape) of the core, cladding, or both the core and the cladding, and possibly by other properties of the optical structure. By shifting the effective index of refraction $\eta_{effective}$ of the optical structure to cause the resonant wavelength of the Bragg resonator 34 to equal the wavelength λ of the optical signal in the Bragg resonator, the first voltage allows the optical signal to excite a resonant mode of the Bragg resonator, which, therefore, passes the optical signal to an output node (e.g., output node 32 of FIG. 1) of the Bragg resonator. Said another way, the first voltage aligns the narrow pass band of the Bragg resonator 34 with the wavelength λ of the optical signal in the Bragg resonator such that the Bragg resonator passes the optical signal.

Conversely, a second blocking voltage (representing, e.g., a logic 0) across the electrodes $28_a$ and $28_b$ of the Bragg resonator 34 shifts the effective index of refraction $\eta_{effective}$ of the optical structure formed by the core 36 and the cladding (not shown in FIGS. 1-2) such that the resonant wavelength of the Bragg resonator is different than the wavelength λ of an optical signal coupled to an input node of the core such that the Bragg resonator blocks the optical signal. Said another way, the second voltage misaligns the narrow pass band of the resonant Bragg resonator 34 with the wavelength λ of the optical signal such that the Bragg resonator rejects the optical signal.

While in a resonant mode, the Bragg resonator 34 is configured to impart, to an optical signal, a phase shift of at least m·360°, where m is an integer, as the signal propagates, along a forward path and feedback path of a feedback loop, from one location within the resonator back to the same location.

To impart this phase shift, the grating profile 40 is sinusoidal, has a spatial wavelength Λ that is equal to $\lambda_{0,r}/2n_{effective}$, where $\lambda_{0,r}$ is the free-space wavelength at which the Bragg resonator 30 is configured to resonate in response to a transmissive, for example, a logic 1, voltage across the electrodes $28_a$ and $28_b$, by imparting an abrupt 180° phase shift at a cross section 48, which is, ideally, half way between the ends $42_a$ and $42_b$ of the core 36 (for example, the cross section 48 is where the two Bragg resonators $41_a$ and $41_b$ abut one another). To impart the abrupt 180° phase shift to an optical signal, the core 36 may include, at the cross section 48, a conventional "single defect" in the lattice structure of the core. Or, the single defect may be considered to be the result of the abrupt 180° phase shift in Λ at the cross section 48.

For example, one way to think about the operation of the optical structure formed by the core 36 and the cladding (not shown in FIGS. 1-2) is that a wave front of an optical signal enters the end $42_a$ of the core having a relative phase of 0° and undergoes a first phase shift of 180° at the cross section 48.

The Bragg reflector $41_b$ redirects a portion of the wave front back into the core 36, and imparts to this redirected portion a second phase shift of 0° or 180°.

The once-redirected wave front then undergoes a third phase shift of 180° at the cross section 48.

The Bragg reflector $41_a$ redirects a portion of the previously redirected wave front back into the core 36, and imparts to this redirected portion a fourth phase shift of 0° or 180° such that the twice-redirected wave front of the optical signal has, as it propagates away from the end $42_a$ back into the core, the same phase that it had when it first entered the core.

In this way, the grating profile 40 and the cross section 48 cause the Bragg resonator 34 to reinforce an optical signal having the wavelength $\lambda_{0,r} \approx 2 \cdot n_{effective} \cdot \Lambda$. In actuality, the wavefront is redirected many times along the optical path through the optical structure, but the end result is the same as described above, that the redirected portions of the optical signals constructively interfere with one another so as to support an oscillation within the optical structure formed by the core 36 and the cladding (not shown in FIGS. 1-2) around the core.

And changing the effective index of refraction $n_{effective}$ of the optical structure by changing the voltage across the electrodes $28_a$ and $28_b$ to a blocking voltage shifts the free-space resonant wavelength of the optical structure away from the desired free-space resonant wavelength $\lambda_{0,r}$ such that the grating profile 40 and the cross section 48 do not cause the Bragg resonator 34 to reinforce an optical signal having a wavelength $\lambda_{0,r}$.

Unfortunately, to impart the abrupt phase change of 180°, the cross section 48 generates an electromagnetic-mode mismatch between the two halves of the core 36, which mismatch causes the Bragg resonator 34 to experience relatively high optical losses, and, therefore, to have a relatively low Q factor in the desired resonant mode.

Referring to FIG. 4, ideally, while the π Phase Shift Bragg resonator 34 is receiving an optical signal having, within the Bragg resonator, a wavelength $\lambda_{0,r} \approx 1555$ nm, a low point 49 of the normalized reflection of the optical cavity would be zero (high Q), indicating that the Bragg resonator is passing all of the energy of the optical signal. In the plot 46, the normalized reflection includes not only energy of the optical signal redirected back to the source (not shown in FIGS. 2-4) of the optical signal, but energy lost through, e.g., dissipation of the optical signal as heat, and leakage of the optical signal out from the core 36.

But because of the optical losses caused by the defect at the cross section 48 (FIGS. 2-3), the low point 49 of the normalized reflection is approximately 60% of the energy of the optical signal, which indicates that the Bragg resonator 34 has a relatively low Q. Said another way, the plot 46 indicates that at its designed-for resonant wavelength $\lambda_{o,r} \approx 1555$ nm, the Bragg resonator 34 is passing only about 40% of the energy of the input optical signal, where, ideally, the Bragg resonator would pass 100% of the energy of the optical signal.

Referring to FIGS. 5-7, one technique for reducing the optical loss, and, therefore, for increasing the Q factor, of a π Phase Shift Bragg resonator is to apodize the grating profile of one or more sides of the core.

FIG. 5 is an isometric view of a π Phase Shift Bragg resonator 50 having a core 52 with an apodized grating profile 54.

FIG. 6 is a plot 60 of the grating profile 54 versus position along the core 52 of FIG. 5.

FIG. 7 is a plot 62 of normalized reflection of the Bragg resonator 50 of FIG. 5 versus the free-space wavelength of an optical signal at an input node (e.g., the optical input node 30 of FIG. 1) of the resonator.

Referring to FIGS. 5 and 6, the Bragg resonator 50 is similar to the Bragg resonator 34 of FIG. 2, except that the grating profile 54 along both sides of the core 52 is apodized. That is, the amplitude of the grating profile 54 is not uniform or constant, but varies relative to position along the core 52. For example, as shown in FIGS. 5-6, the peak-to-peak amplitude of the grating profile 54 linearly decreases from an end $64_a$ of the core 52 to an abrupt-phase-change cross section 66; likewise, the peak-to-peak amplitude of the grating profile linearly increases from the cross section to an end $64_b$ of the core. Although described as changing linearly, the peak-to-peak amplitude can change in any suitable fashion, such as exponentially or in discrete steps.

Referring to the plot 62 of FIG. 7, although apodizing the grating profile 54 of FIG. 5-6 changes the effective index of refraction $\eta_{effective}$ of the core 52, and, therefore, shifts the resonant free-space wavelength $\lambda_{o,r}$ from about 1555 nm to about 1567 nm, apodizing the grating profile reduces optical reflection and losses to almost zero (note the low point 68 of the plot is almost at a zero value for normalized reflection) while the Bragg resonator 50 is in a transmissive (pass) mode.

Consequently, the apodized grating profile 54 increases both the Q factor and the extinction ratio of the Bragg resonator 50 as compared to the non-apodized Bragg resonator 34 of FIG. 2.

But a potential problem with the Bragg resonator 50 is that the length l of the core 52 between the core ends $64_a$ and $64_b$ may be too long for some applications, particularly for higher-density integrated photonic circuits, and higher-density integrated mixed-signal devices that include both integrated electrical circuits and integrated photonic circuits.

FIG. 8 is a plot 80 of the transmission levels of the Bragg resonator 50 of FIG. 5 versus wavelengths at selected lengths l of the apodized core 52, where the transmission level is effectively the opposite of the reflection level plotted in FIG. 7. For example, when the normalized reflection level is zero (no energy of the optical signal reflected or otherwise lost), then the transmission level is unity, or one (100% of the energy of the optical signal is passed), and when the normalized reflection level is one (100% of energy of the optical signal reflected or otherwise lost), then the transmission level is zero (no energy of the optical signal is transmitted).

Referring to FIGS. 5 and 8, to have a transmission level that approaches 100%, and, therefore, to have a suitably high Q and a suitably high extinction ratio for some applications, the length l of the apodized core 52 of the Bragg resonator 50 is at least 16 microns (μm), and preferably 20 μm. That is, to provide suitably high values of Q and the extinction ratio for some applications, the length l of the apodized core 52 is between ten and thirteen times longer than the free-space wavelength at which the Bragg resonator 50 is designed to resonate in a transmissive mode.

Therefore, a need has arisen for an electro-optic-modulator core that is of a size, and that yields a level of signal loss and values of Q and extinction ratio, suitable for use in applications that call for higher-density integrated photonic and mixed-signal circuits.

An embodiment of an optical structure suitable for use in an electro-optic modulator includes a core having first and second ends, at least one side with a grating profile having a phase shift distributed between the first and second ends, and a cladding disposed around the core.

As described below, a grating profile having a distributed phase shift allows for a smaller core as compared to an apodized grating profile having an abrupt phase shift.

DETAILED DESCRIPTION

Unless otherwise noted, a value, quantity, or attribute herein preceded by "substantially," "approximately," "about," a form or derivative thereof, or a similar term, encompasses a range that includes the value, quantity, or attribute ±20% of the value, quantity, or attribute, and a range of values preceded by such a term includes the range extended by ±20% of the difference between the range endpoints. For example, an "approximate" range of b to c is a range of b−20%·(c−b) to c+20%·(c−b). Furthermore, the terms "a," "an," and "the" can indicate one or more than one of the objects that they modify.

Figure 9:
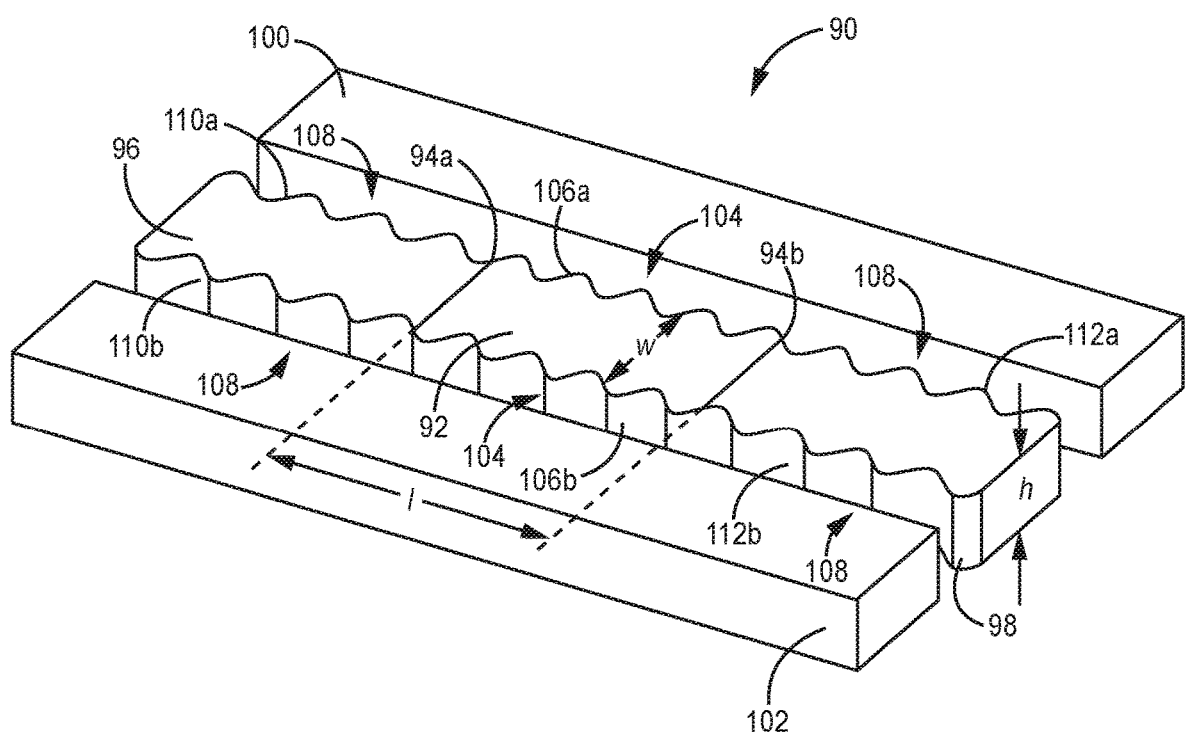
FIG. 9 is an isometric view of a distributed-phase-shift resonator, according to an embodiment.

FIG. 9 is an isometric view of a distributed-phase-shift resonator 90, according to an embodiment. The resonator 90 includes a core 92 having ends $94_a$ and $94_b$, reflectors 96 and 98, electrodes 100 and 102, and a cladding (not shown in FIG. 9) disposed around the core and the reflectors. The core 92 has a sinusoidal distributed-phase-shift grating profile 104 along two sides $106_a$ and $106_b$ of the core, and each reflector 96 and 98 has a non-phase-shift grating profile 108 along two sides 110a, 110b, and 112a, 112b, respectively. The combination of the core 92 and the cladding (not shown in FIG. 9) between the core ends $94_a$ and $94_b$ forms an optical structure, and the optical structure, and possibly portions of the reflectors 96 and 98 adjacent to the core, form an optical cavity.

Figure 10:
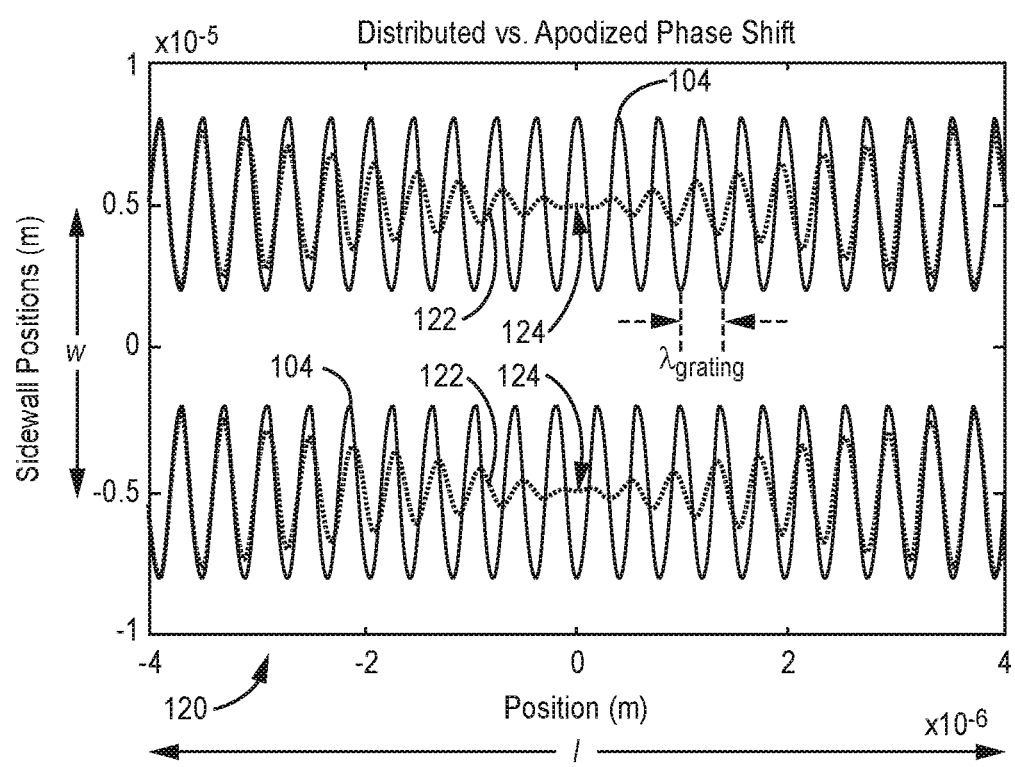
FIG. 10 is a plot of an embodiment of a grating profile of the core of the distributed-phase-shift resonator of FIG. 9 overlaying the grating profile of the apodized core of the π Phase Shift Bragg resonator of FIG. 5.

FIG. 10 is a plot 120 of the two instances of the grating profile 104 along the sides $106_a$ and $106_b$ of the core 92 of FIG. 9, according to an embodiment, and, two instances of a potential apodized grating profile 122 respectively overlaying the two instances of the grating profile 104 for purposes of comparison ("potential" indicates that the core 92 does not actually have the apodized grating profile, but if it were to have an apodized grating profile, it could be like the profile 122). In this example, the length l of the core 92 is 8.0 µm, the width w of the core between the vertical centers (e.g., zero crossings) of the two instances of the grating profile 104 is 10.0 µm, and the thickness, i.e., height h, of the core is 600 nm. Furthermore, the potential apodized grating profile 122 is similar to the apodized grating profile 54 of FIGS. 5-6 in that it has an abrupt phase shift of 180° at a center location 124 and the peak-to-peak amplitude decreases linearly from the right and left sides of the plot 120 toward the center location. Moreover, the spatial wavelengths of the grating profiles 104, 108, and 122 are equal to 1550 nm/$2 \cdot \eta_{effective}$, although the grating profile 108 of the resonators 96 and 98 exhibits no spatial phase shift. In this example, $\eta_{effective}$ has a value that is between the refractive index $\eta_{core}$ of the material (e.g., lithium niobate) from which the core 92 is formed and the refractive index $\eta_{cladding}$ of the material from which the cladding (not shown in FIG. 9) is formed, at the waveguide mode excited by an optical signal having a free-space wavelength of 1550 nm. In addition to depending on the refractive indices $\eta_{core}$ and $\eta_{cladding}$, the value of $\eta_{effective}$ depends on the geometry of the optical structure (e.g., the shape of the core disregarding the grating profile 104, which shape would be a rectangle l=8 µm long, w=10 µm wide, and h=600 nm high), the wavelength of the exciting optical signal, and the spatial parameters (e.g., wavelength, amplitude, phase shift) of the grating profile.

Referring to FIGS. 9-10, major differences between the distributed-phase-shift grating profile 104 and the apodized grating profile 122 include that the distributed-phase-shift grating profile ideally has a uniform peak-to-peak amplitude, and that instead of having an abrupt phase shift of 180°, the distributed-phase-shift grating profile has a phase shift of 180° that is linearly distributed over the length l of the core 92. Further to the latter difference, at the −4 µm position (end $94_a$ in FIG. 9) of the core 92, the spatial phases of the grating profiles 104 and 122 are equal; at the center location 124, the apodized grating profile undergoes an abrupt 180° spatial phase shift, while the distributed-phase-shift grating profile has linearly accumulated a spatial phase shift of 90°; and at the rightmost +4 µm position (end $94_b$ in FIG. 9) the spatial phase of the distributed-phase-shift grating profile has linearly accumulated another spatial phase shift of 90° such that both the distributed-phase-shift and apodized grating profiles have accumulated the same 180° phase shift relative to their phases at the −4 µm position.

Figure 11:
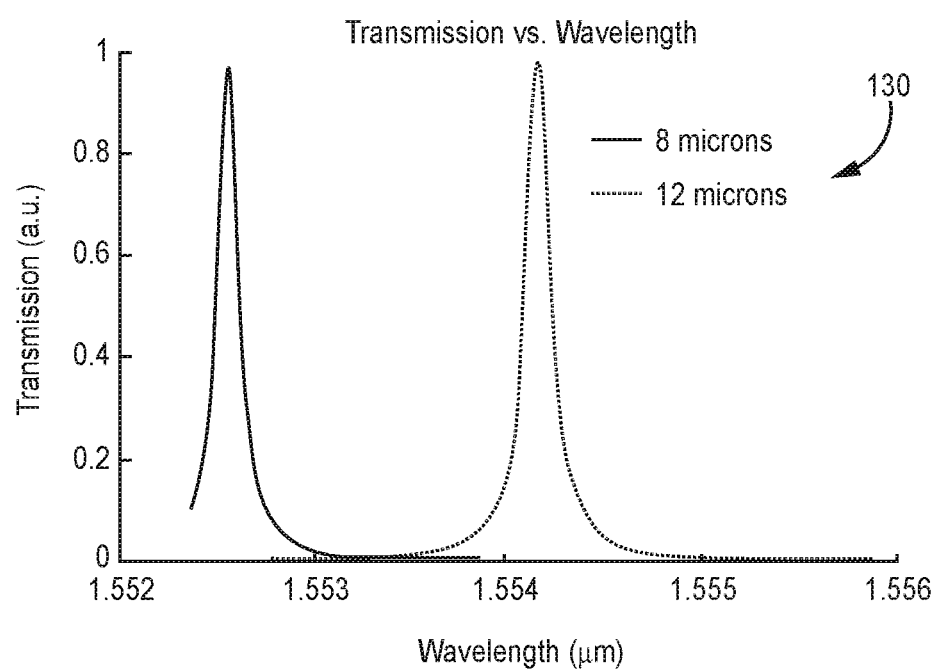
FIG. 11 is a plot of transmission levels of an optical signal propagating in the distributed-phase-shift Bragg resonator of FIG. 9 versus the free-space wavelength of the optical signal at selected lengths of the resonator core, according to an embodiment.

FIG. 11 is a plot 130 of the transmission levels of the distributed-phase-shift resonator 90 of FIG. 9 versus wavelength at selected core lengths l=8 µm and l=12 µm, according to an embodiment.

Referring to FIGS. 5, 8, 9, and 11, the core 92, with its distributed-phase-shift grating profile 104, can provide transmission levels of almost unity for core lengths l=8 µm and l=12 µm, which lengths are, respectively, about half of the core lengths l=16 µm and l=20 µm that the core 52, with its apodized grating profile 54, needs to provide similarly high transmission levels.

Consequently, the core 92, with its distributed-phase-shift grating profile 104, can be significantly shorter than the core 52 with its apodized grating profile 54, yet can provide transmission levels equivalent to those provided by the apodized core 52.

Figure 5:
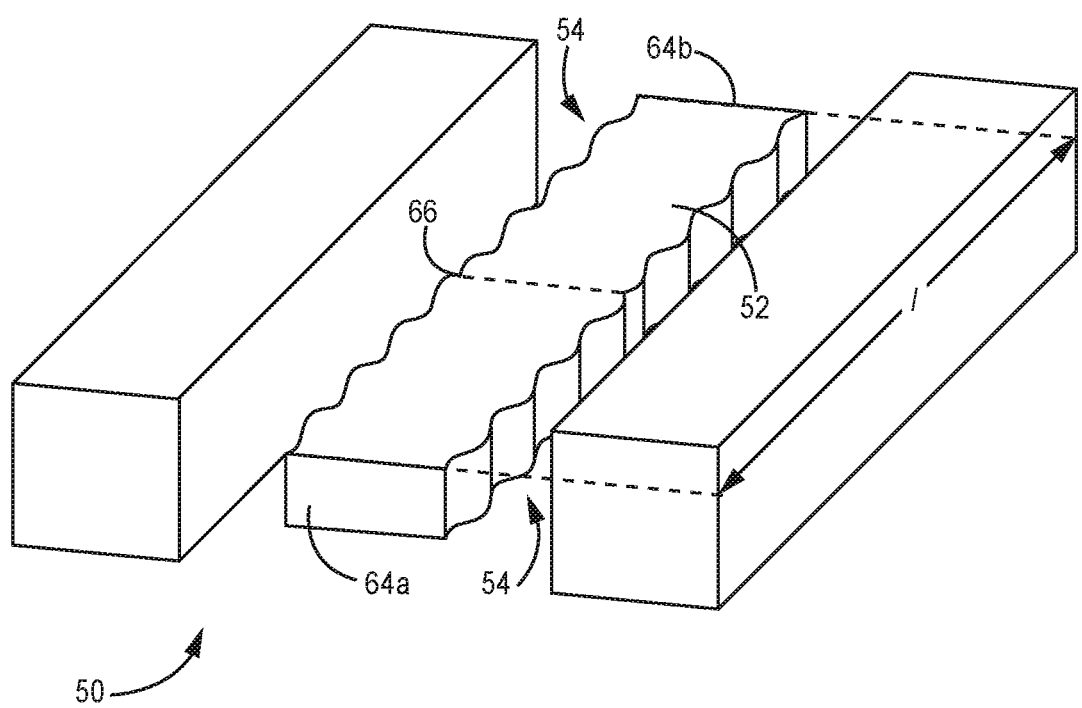
FIG. 5 is an isometric view of a π Phase Shift Bragg resonator having a core with an apodized grating profile that provides increased values for Q and extinction ratio as compared to the π Phase Shift Bragg resonator of FIG. 2.
Figure 6:
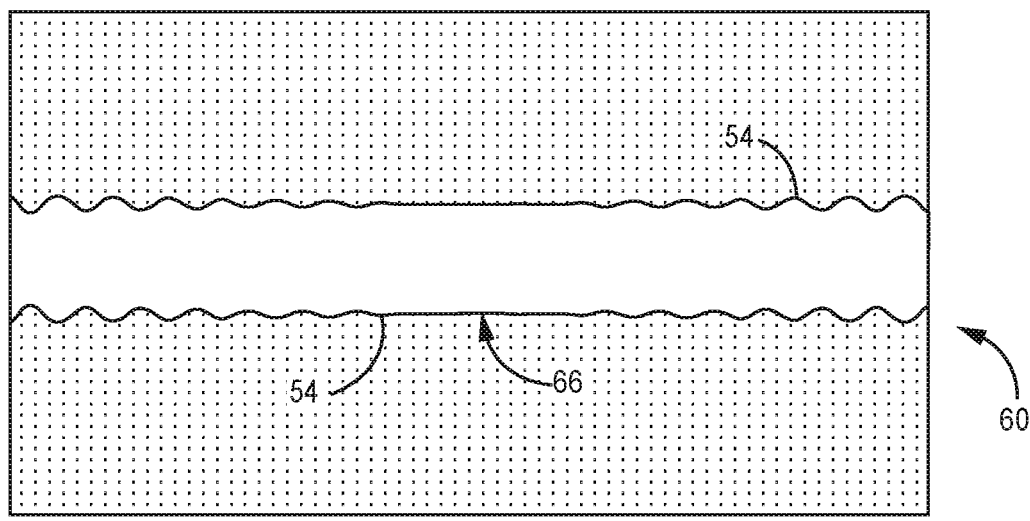
FIG. 6 is a plot of the apodized grating profile of the core of the π Phase Shift Bragg resonator of FIG. 5 versus position along the core.
Figure 7:
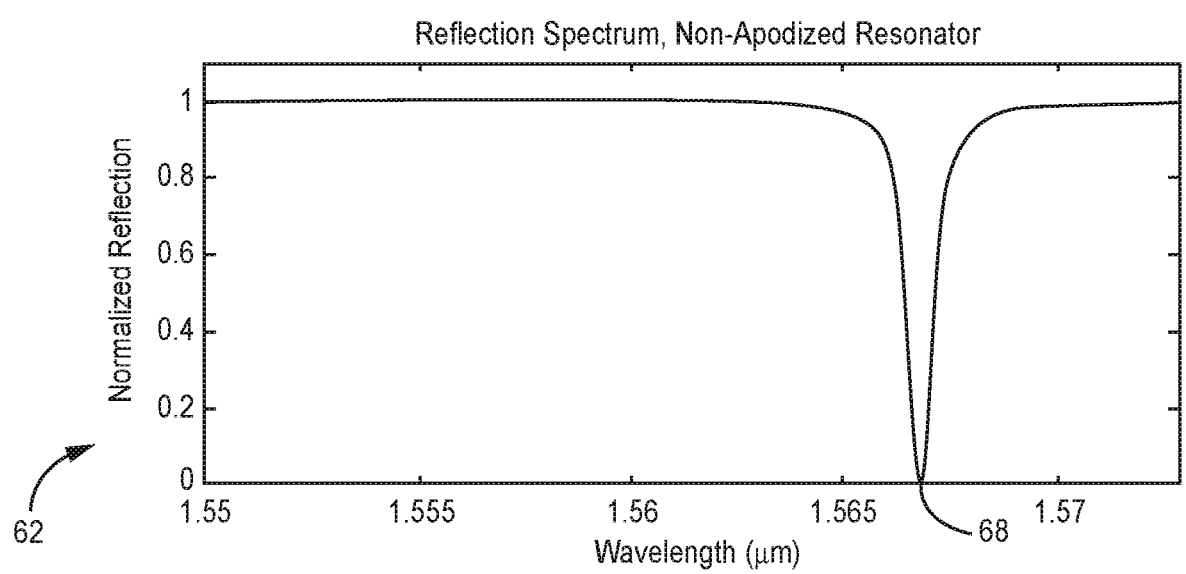
FIG. 7 is a plot of normalized reflection (loss) of an optical signal propagating in the π Phase Shift Bragg resonator of FIG. 5 versus the free-space wavelength of the optical signal.
Figure 8:
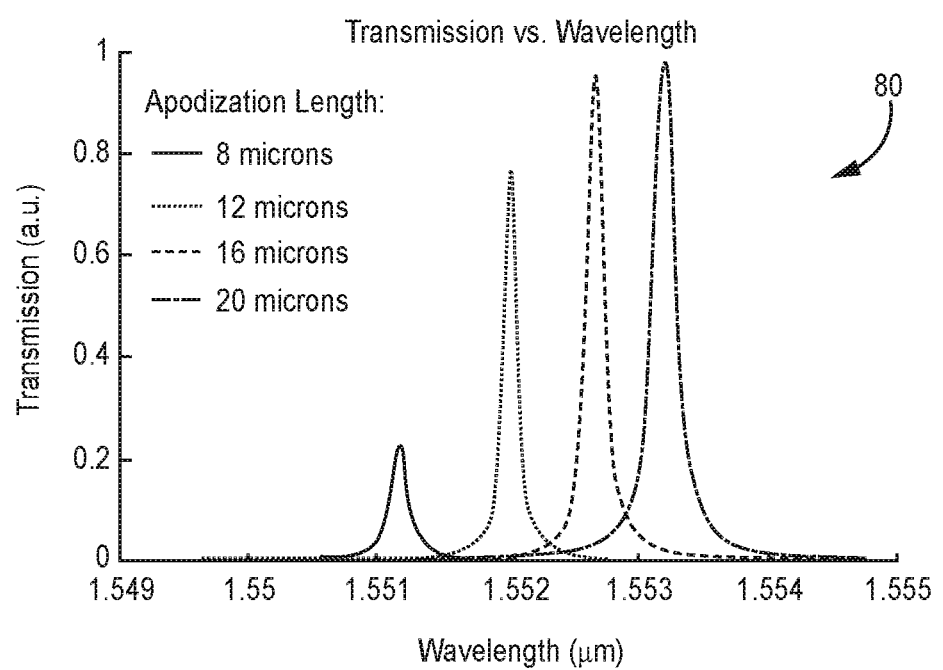
FIG. 8 is a plot of transmission levels of an optical signal propagating in the π Phase Shift Bragg resonator of FIG. 5 versus the free-space wavelength of the optical signal at selected lengths of the apodized core of the resonator.

And because it can incorporate a shorter core 92, the distributed-phase-shift resonator 90 can be shorter overall than the apodized π Phase Shift Bragg resonator 50 of FIG. 5.

Therefore, the distributed-phase-shift resonator 90 may be suitable for applications that call for an electro-optic modulator that is smaller than the apodized π Phase Shift Bragg resonator 50 of FIG. 5.

Referring to FIGS. 9 and 11, the resonant free-space wavelength $\lambda_{0,r}$ for which the resonator 90 is designed for a transmission-level voltage (e.g., logic 1, as opposed to a blocking-level voltage, e.g., logic 0) across the electrodes 100 and 102 is slightly different than a sometimes-desired wavelength of 1550 nm, which, in this example, is equal to $2 \cdot \Lambda \cdot n_{effective}$, where, as described above, $\Lambda$ is the spatial wavelength of the grating profile 104. That is, the grating profile 104 having a particular spatial wavelength $\Lambda$ slightly shifts the actual free-space resonant wavelength $\lambda_{0,r}$ of the resonator 90 from the desired free-space resonant wavelength $2 \cdot \Lambda \cdot n_{effective}$. One way to account for this shift in $\lambda_{0,r}$ is to reduce the spatial wavelength Λ of the grating profile 104 to a value that causes the actual resonant wavelength $\lambda_{o,r}$ to equal the desired wavelength, e.g., 1550 nm. Another way to account for this shift in $\lambda_{o,r}$ is to use a tunable light source (e.g., a tunable cavity laser) to generate the input optical signal, and to tune the light source to generate the input optical signal to have the resonant wavelength $\lambda_{o,r}$ of the resonator 90 while the resonator is in a transmissive (resonant) mode.

Referring to FIGS. 9-10, design and operation of the distributed-phase-shift resonator 90 is described, according to an embodiment.

First, a designer determines the resonant free-space wavelength $\lambda_{o,r}$ that he/she wants the resonator 90 to have for a transmission-level voltage (e.g., logic 1, as opposed to a blocking-level voltage, e.g., logic 0). The designer determines the length l, width w, and thickness/height h of the core 92, and the respective materials from which he/she wants the core and cladding (not shown in FIGS. 9-10) to be formed. The length l can be of any suitable value, for example, in an approximate range of 4 μm-25 μm, the width w can be of any suitable value, for example, in an approximate range of 1 μm-5 μm, and the height h can be of any suitable value, for example, in an approximate range of 300-1000 nm. Furthermore, the core and cladding each can be formed from any suitable material, examples of which include lithium niobate, silicon, silicon nitride, silicon germanium, germanium, gallium nitride, gallium arsenide, and diamond. Next, in response to the dimensions of the core 92 and the cladding, the indices of refraction $\eta_{pore}$ and $\eta_{cladding}$ of the materials respectively used to form the core and the cladding, and the desired $\lambda_{o,r}$, the designer determines, in a conventional manner, the effective refractive index $\eta_{effective}$ of the resonator 90 without a grating profile.

Next, the designer sets a value of the spatial wavelength Λ of the grating profile 104 equal to $\lambda_{o,r}/(2\cdot\eta_{effective})$.

Then, according to an embodiment, the designer accounts for the grating profile 104 causing the actual value of the resonant wavelength $\lambda_{o,r}$ to be different from the value determined according to the preceding paragraph by specifying that a light source used to excite the resonator 90 be tunable to the actual value of the resonant wavelength $\lambda_{o,r}$.

Alternatively, according to another embodiment, using conventional computer-simulation or other analytical techniques, the designer determines, for the grating profile 104, a value of the spatial wavelength Λ that is slightly different (e.g., within ±1%) than the desired value $\lambda_{o,r}/(2\cdot\eta_{effective})$ but that causes $\lambda_{o,r}$ to have the desired value. Said another way, the designer uses computer simulation or other analytical techniques to "tweak" the spatial wavelength Λ of the grating profile 104 so that the resonator 90 has a resonant wavelength equal to the desired resonant wavelength $\lambda_{o,r}$ (e.g., 1550 nm)

Then, the designer determines the dimensions of the sinusoidal grating profile 104. The designer sets the spatial wavelength Λ as described in the preceding paragraphs. The designer sets the peak-to-peak amplitude of the grating profile 104 to any suitable value, such as a value in an approximate range of 500 nm-5000 nm, where the maximum allowable value of the peak-to-peak amplitude depends on the width w of the core 92. And the designer determines how to distribute the 180° phase shift of the grating profile 104 across the length l of the core 92. For example, the phase shift may be distributed linearly as shown in FIGS. 9-10. Examples of other phase distributions include exponential phase distribution, sinusoidal phase distribution, and discrete-step phase distribution.

Next, the designer determines the dimensions and other parameters of the reflectors 96 and 98. For example, each reflector 96 has the same width w and height h as the core 92, and the grating profile 108 has the same spatial wavelength Λ as the grating profile 104 of the core, but without a phase shift. The designer determines other parameters of each of the reflectors 96 and 96, such as the length, materials, refractive indices of the materials, and arrangement of the materials in a conventional manner. For example, each reflector 96 and 98 may be a Bragg reflector having a length that is much greater than the length l of the core 92.

Then, if he/she has not already done so, the designer chooses a cladding material for disposition around the core 92 and reflectors 96 and 98. Examples of cladding material include silicon dioxide, silicon nitride, gallium nitride, and diamond. As described above, to increase the precision of the determination of Λ, the designer may choose the cladding material before determining the value for Λ so that the designer can consider any effect that the cladding material or its effective refractive index may have on Λ.

Referring to FIG. 9, operation is described for an embodiment of the resonator 90 in which the core 92 has the following parameters: l=8 μm, w=2.0 μm, h=600 nm, desired resonant transmission wavelength is $2\cdot\Lambda\cdot\eta_{effective}$=1550 nm, actual resonant wavelength $\lambda_{o,r}$=1552.5 nm, and a 180° phase shift linearly distributed between the ends 94$_a$ and 94$_b$ of the core.

During a transmission mode of operation, a drive circuit (not shown in FIG. 11) applies a transmission-level voltage (e.g., a logic 1 level) across the electrodes 100 and 102 to configure the resonator 90 to resonate at $\lambda_{o,r}$=1552.5 nm.

A wave front of an optical signal (e.g., from a tunable cavity laser) having a free-space wavelength of 1552.5 nm enters one of the reflectors 96 and 98, for example, the reflector 96.

The wave front accumulates an approximate 180° phase shift as it propagates through the core 92 to the reflector 98.

The reflector 98 redirects a portion of the wave front signal back into the core 92, and imparts to the redirected portion a phase shift of either approximately 0° or 180°, depending upon its structure. As is known, the reflector 98 may not redirect all of the redirected signal energy of the wave front at the interface between the core 92 and the reflector; portions of the wave front may propagate respective distances into the reflector before being redirected. These redirected portions effectively interfere with one another at the interface between the reflector 98 and the core 92 to form a redirected wave front that propagates back into the core.

Figure 1:
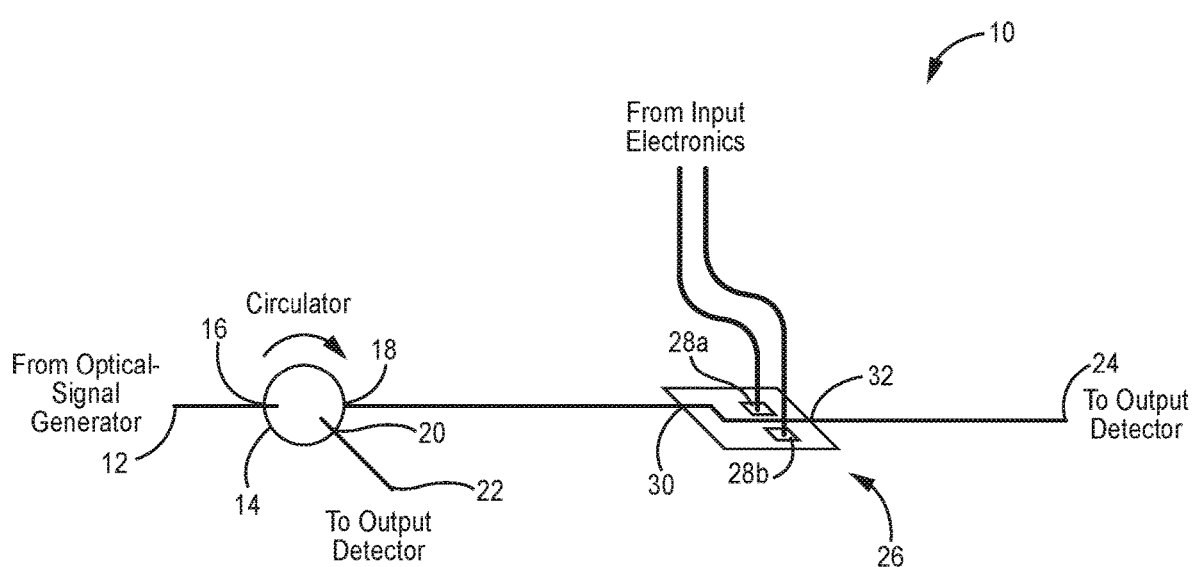
FIG. 1 is a diagram of a binary optical switch that is configured to convert an electrical binary signal to an optical binary signal.
Figure 2:
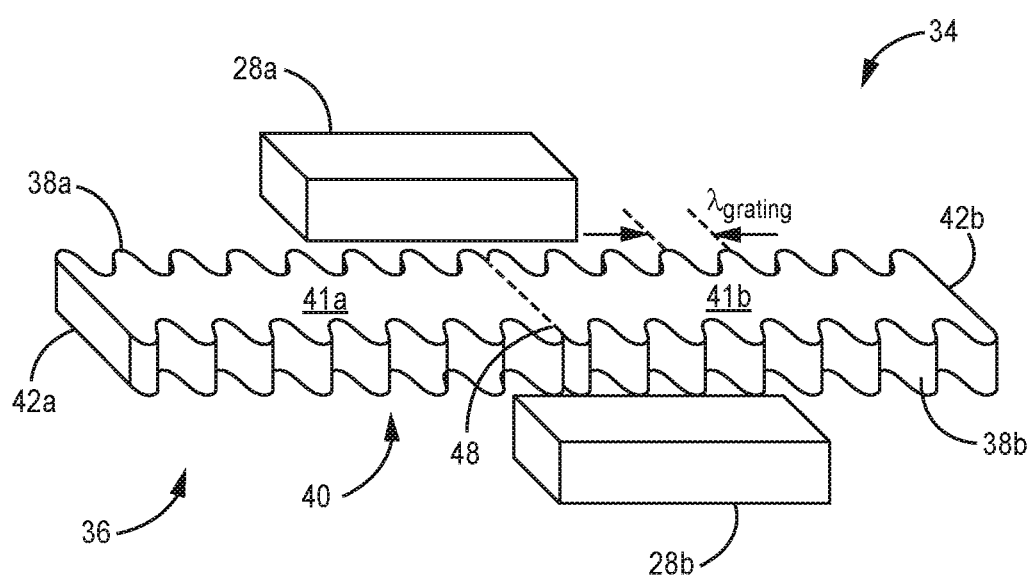
FIG. 2 is an isometric view of a π Phase Shift Bragg resonator that can be used as the electro-optic modulator (EOM) of FIG. 1.
Figure 3:
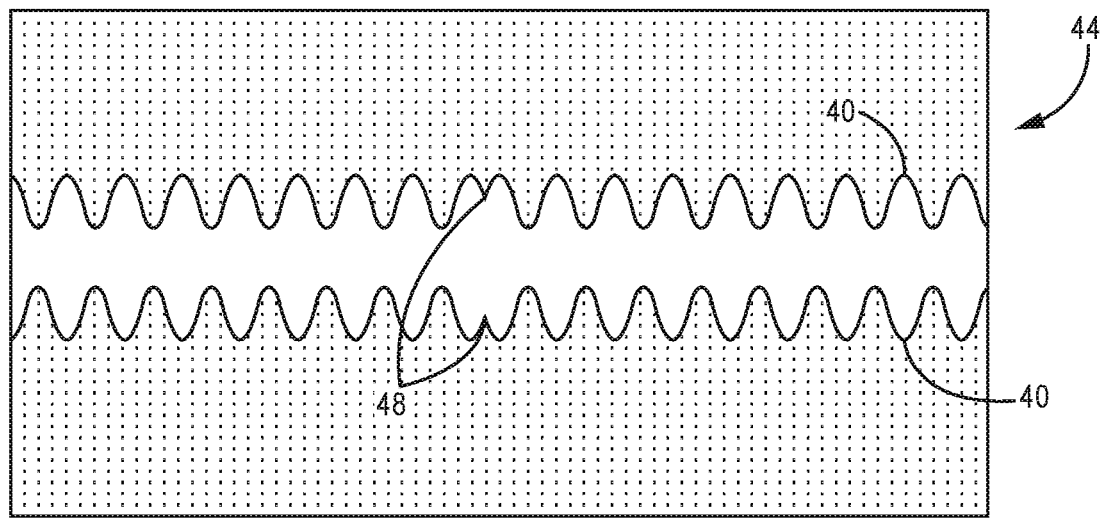
FIG. 3 is a plot of the grating profile versus position along the core of the π Phase Shift Bragg resonator of FIG. 2.
Figure 4:
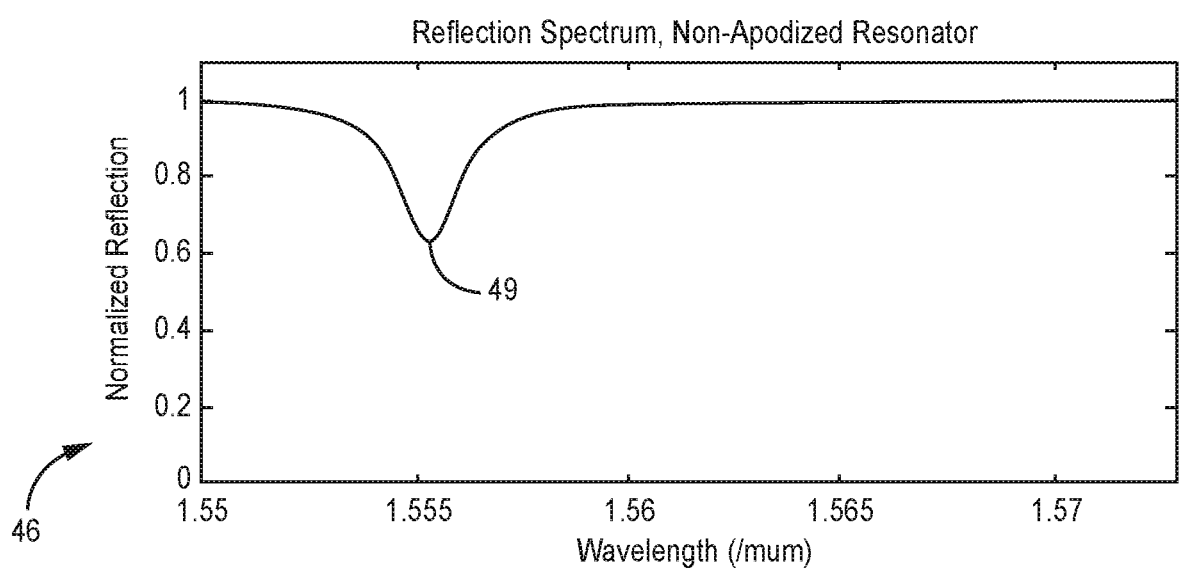
FIG. 4 is a plot of normalized reflection (loss) of an optical signal propagating in the Phase Shift Bragg resonator of FIG. 2 versus the free-space wavelength of the optical signal.

The remaining portion of the wave front of the optical signal continues propagating through the reflector 98 and to, for example, an output port of a binary switch, such as the output port 24 of the optical switch 10 of FIG. 1.

The once-redirected portion of the wave front of the optical signal accumulates another approximately 180° of phase shift as it propagates back through the core 92.

Upon reaching the end 94$_a$ of the core 92, the reflector 96 redirects a portion of the once-redirected wave front back into the core in a manner similar to that described above for the reflector 98, and imparts to the twice-redirected wave front a phase shift of either approximately 0° or 180° such that the twice-redirected wave front has accumulated a total phase shift of m·360°, where m=1 or 2. Because the twice-redirected portion of the wave front constructively interferes with, and, therefore, reinforces, the optical signal entering the core 92 from the optical source (not shown in FIG. 9) via the reflector 96, an oscillation, or resonance, occurs within the core 92, and potentially within portions of the reflectors 96 and 96 adjacent to the core for reasons described above. It is these portions of the reflectors 96 and 98 in which resonance occurs, along with the core 92 and the cladding material around the core and the reflector portions, that forms a resonant optical cavity.

A result of this resonant operation, or resonant waveguide mode, is that propagating out from the reflector 98 in a direction away from the core 92 is an output optical signal having an output power that is approximately the same as the input power minus signal loss incurred in the resonator 90.

Furthermore, during resonant operation, little or no signal power is redirected by the core 92 back through the reflector 96 toward the optical source (not shown in FIG. 9).

Consequently, the extinction ratio of output power/redirected power is relatively high as is desired.

During a blocking mode of operation, the drive circuit (not shown in FIG. 11) applies a blocking-level voltage (e.g., a logic 0 level) across the electrodes 100 and 102 to configure the resonator 90 to resonate at a wavelength that is significantly different from $\lambda_{0,r}$=1552.5 nm.

An optical signal (e.g., from a tunable cavity laser) having a free-space wavelength of 1552.5 nm enters one of the resonators 96 and 98, for example, the resonator 96.

The core 92 acts as a high impedance to the optical signal, and, therefore, redirects most of the energy of the optical signal back into the reflector 96 such that little or no optical energy propagates to and out through the reflector 98.

Therefore, propagating out from the reflector 98 in a direction away from the core 92 is an output optical signal having an output power that is approximately zero.

Furthermore, most of the signal power is redirected by the core 92 back through the reflector 96 toward the optical source (not shown in FIG. 9) and, for example, out of a signal-coupled port such as the port 22 of the binary switch 10 of FIG. 1.

Consequently, as in the transmission mode, in the blocking mode the extinction ratio redirected power/output power is relatively high as is desired.

Referring to FIGS. 9-11, alternate embodiments of the distributed-phase-shift Bragg resonator 90 are contemplated. For example, although shown as being sinusoidal, the grating profile 104 can have a shape other than sinusoidal. Furthermore, the respective amount of phase shift that each of the core 92 and reflectors 96 and 98 impart to the optical signal can be different than described above as long as the "round-trip" phase shift from one point back to the same point is an integer multiple of 360°. Moreover, although the grating profile 104 is shown as being the same on both sides $106_a$ and $106_b$ of the core 92, the grating profile can be on only one side, or each side can have a different grating profile. In addition, one or both of the top and bottom of the core 92 can be grated. Similarly, although the grating profile 108 is shown as being the same on both sides of each reflector 96 and 98, the grating profile can be on only one side, or each side can have a different grating profile. Furthermore, one or both of the top and bottom of each reflector 96 and 98 can be grated.

Figure 12:
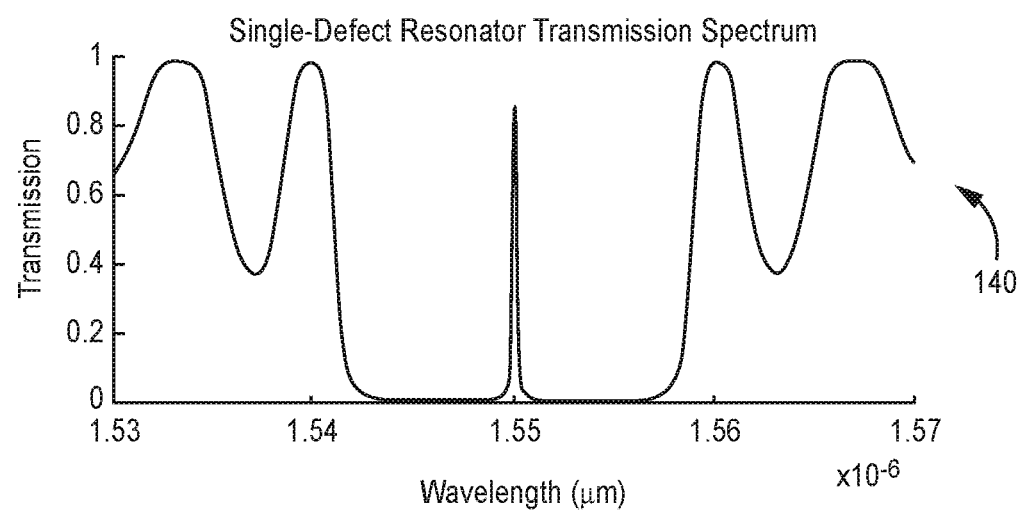
FIG. 12 is a plot of wavelength response of the distributed-phase-shift resonator of FIG. 9, according to an embodiment.

FIG. 12 is a plot 140 of the wavelength response of the distributed-phase-shift resonator 90 of FIG. 9, according to an embodiment where $\lambda_{0,r}$=1550 nm. Because the resonator 90 effectively has only a single defect (the core 92 imparts a 180° phase shift), the resonator supports only a single resonant mode in the vicinity of $\lambda_{0,r}$.

Figure 13:
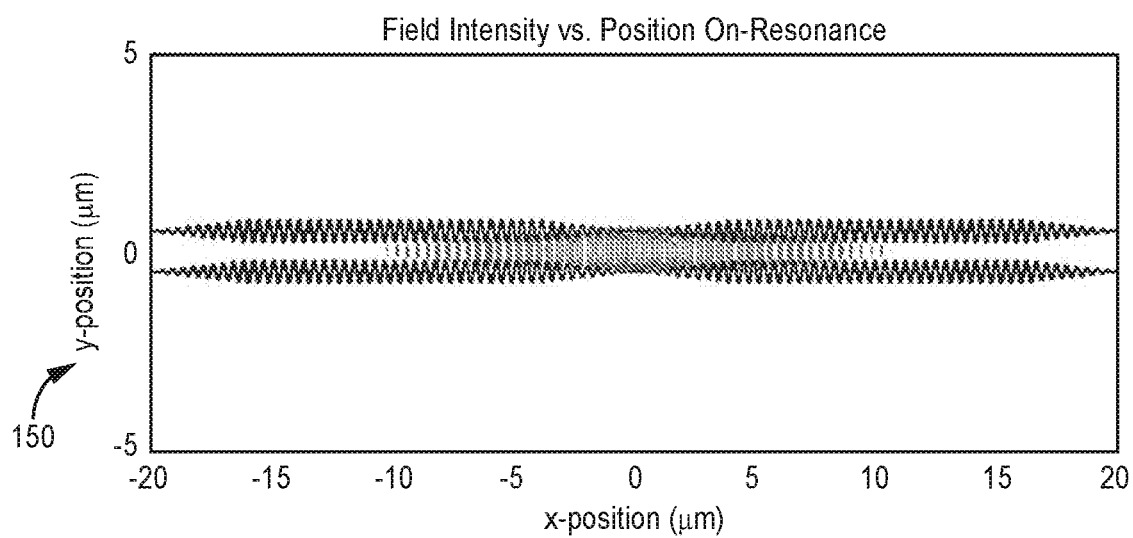
FIG. 13 is a plot of the intensity level of an optical signal propagating in the distributed-phase-shift resonator of FIG. 9 during a resonant mode versus position along the resonator, according to an embodiment.

FIG. 13 is a plot 150 of field intensity versus position along the core 92 and reflectors 96 and 98 of the distributed-phase-shift resonator 90 of FIG. 9 during a transmission mode, according to an embodiment in which the length l of the core 92 is 8 μm. Most of the resonant behavior (higher levels of signal intensity) occurs within the core 92, although some resonant behavior occurs up to a distance of about 1 μm into each of the reflectors 96 and 98. The distance into the reflectors 96 and 98 in which resonant behavior occurs is a function of the construction of the reflectors, and a designer can make this distance smaller or larger than 1 μm by appropriately configuring the resonators in a conventional manner.

Figure 14:
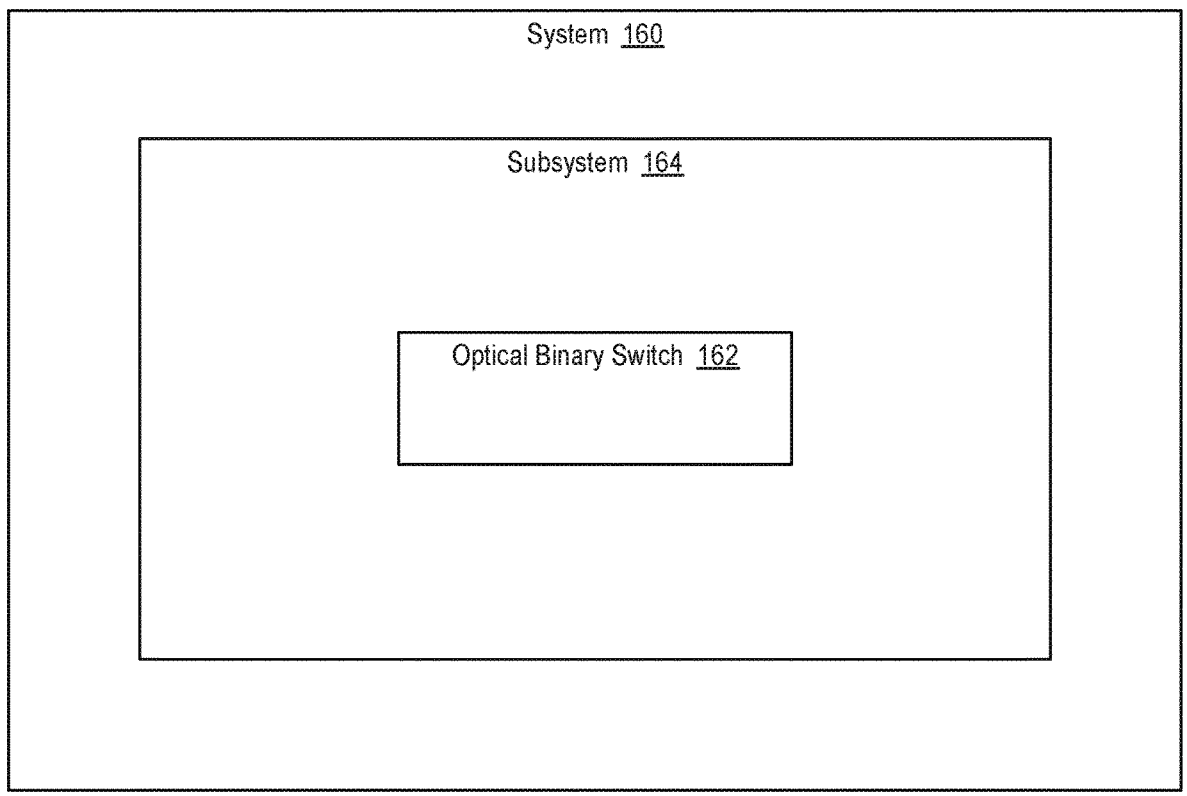
FIG. 14 is diagram of a system including an optical binary switch that incorporates one or more of the distributed-phase-shift resonator of FIG. 9, according to an embodiment.

FIG. 14 is a diagram of a system 160 including one or more of an optical binary switch 162, which incorporates the distributed-phase-shift resonator 90 of FIG. 9, according to an embodiment.

The system 160 includes a subsystem 164. Examples of the system 160 include a vehicle such as an aircraft, spacecraft, watercraft, submarine, land vehicle, unmanned vehicle such as a drone, or a missile. Examples of the subsystem 164 include a navigation subsystem, flight-management subsystem, communications subsystem, and sensor subsystem.

The subsystem 164 includes one or more of the optical binary switch 162, which may be similar to the optical binary switch 10 of FIG. 1 except that the switch 162 includes the distributed-phase-shift resonator 90 of FIG. 9 as the electro-optic modulator 26. For example, an optical binary switch 162 may be disposed on an integrated circuit and may provide communications between the integrated circuit and an apparatus or device external to the integrated circuit.

From the foregoing, it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the circuit components described above may be disposed on a single or multiple integrated-circuit (IC), a digital signal processor (DSP), a filter and detect (FAD) circuit, integrated-photonic (IP) dies, or radio-frequency-over-glass (RFOG) dies to form one or more ICs/IPs/RFOGs/DSP/FAD, where these one or more ICs/IPs/RFOGs/DSP/FAD may be coupled to one or more other ICs/IPs/RFOGs/DSP/FAD. Furthermore, one or more components of a described apparatus or system may have been omitted from the description for clarity or another reason. Moreover, one or more components of a described apparatus or system that have been included in the description may be omitted from the apparatus or system.

Example Embodiments

What is Exampleed is:

Example 1 includes an optical structure, comprising: a core having first and second ends and a first side with a first grating profile having a first phase shift distributed between the first and second ends; and a cladding disposed around the core.

Example 2 includes the optical structure of Example 1 wherein: the core includes lithium niobate; and the cladding includes silicon dioxide.

Example 3 includes the optical structure of any of Examples 1-2, wherein the first grating profile includes a sinusoidal grating profile.

Example 4 includes the optical structure of any of Example 1-3, wherein the first phase shift is 180° of a spatial wavelength of the first grating profile.

Example 5 includes the optical structure of any of Examples 1-4, wherein the first grating profile has one half of the first phase shift distributed between the first end of the core and a midpoint between the first and second ends of the core, and has another half of the first phase shift distributed between the midpoint and the second end of the core.

Example 6 includes the optical structure of any of Examples 1-5, wherein the first phase shift is distributed linearly between the first and second ends of the core.

Example 7 includes the optical structure of any of Examples 1-6, wherein the core includes a second side with a second grating profile having a second phase shift distributed between the first and second ends of the core.

Example 8 includes the optical structure of any of Examples 1-7, wherein the core includes a second side with the first grating profile.

Example 9 includes the optical structure of any of Examples 1-8, wherein the first grating profile has a uniform amplitude between the first and second ends of the core.

Example 10 includes A electro-optic modulator, comprising: an optical structure, including first and second ends, a core having a first side with a first grating profile having a first phase shift distributed between the first and second ends, and a cladding disposed around the core; a first electrode disposed adjacent to the first side of the core; and a second electrode disposed adjacent to a second side of the core, the second side being opposite the first side.

Example 11 includes the electro-optic modulator of Example 10, wherein the second side of the core has a second grating profile having a second phase shift distributed between the first and second ends of the optical cavity.

Example 12 includes the electro-optic modulator of any of Examples 10-11, wherein: the second grating profile is approximately the same as the first grating profile; the second phase shift is approximately the same as the first phase shift; and the second phase shift is distributed between the first and second ends in a manner similar to a manner in which the first phase shift is distributed between the first and second ends.

Example 13 includes the electro-optic modulator of any of Examples 10-12, wherein first and second phase shifts are each distributed approximately uniformly between the respective first and second ends.

Example 14 includes the electro-optic modulator of any of Examples 10-13, wherein: the optical structure is configured to resonate at an optical frequency in response to a first voltage between the first and second electrodes; and the optical structure is configured to attenuate an optical signal at the optical frequency in response to a second voltage between the first and second electrodes.

Example 15 includes the electro-optic modulator of any of Examples 10-14, further comprising: a first reflector disposed at the first end of the optical structure and configured to impart a second phase shift to an optical signal propagating in the structure; a second reflector disposed at the second end of the optical structure and configured to impart a third phase shift to the optical signal; and wherein a combination of the optical structure, the first reflector, and the second reflector is configured to resonate at an optical wavelength in response to a sum of the first, second, and third phase shifts equaling 360° of the optical wavelength.

Example 16 includes the electro-optic modulator of any of Examples 10-15, further comprising: a first Bragg reflector disposed at the first end of the optical structure and configured to impart, to an optical signal propagating in the structure, a phase shift of approximately 180° of a spatial wavelength of the first grating profile; a second Bragg reflector disposed at the second end and configured to impart, to the optical signal, a phase shift of approximately 180° of the spatial wavelength of the first grating profile; and wherein the optical structure is configured to impart, to the optical signal, a phase shift equal to approximately 180° of the spatial wavelength to the optical signal.

Example 17 includes A method, comprising: causing an optical structure to pass an optical signal by causing a wavelength of the optical signal in the optical structure to be approximately equal to twice a spatial wavelength of a grating profile of a side of a core of the optical structure, the grating profile having a phase shift distributed along the side of the core; and causing the optical structure to block the optical signal by causing the wavelength of the optical signal in the optical structure to be different from twice the spatial wavelength.

Example 18 includes the method of Example 17, wherein: causing the optical structure to pass the optical signal includes generating a first voltage across the optical structure; and causing the optical structure to block the optical signal includes generating a second voltage across the optical structure.

Example 19 includes the method of any of Examples 17-18, wherein: causing the optical structure to pass the optical signal includes causing the wavelength of the optical signal to equal a resonant wavelength of the structure; and causing the optical structure to block the optical signal includes causing the wavelength of the optical signal to be different than the resonant wavelength of the structure.

Example 20 includes the method of any of Examples 17-19, wherein: causing the optical structure to pass the optical signal includes gradually shifting a phase of the optical signal by 180° as the optical signal propagates from one end of the optical structure to another end of the optical structure; and causing the optical structure to block the optical signal includes gradually shifting the phase of the optical signal by other than 180° as the optical signal propagates from one end of the optical structure to the other end of the optical structure.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. An optical structure, comprising:
    a core having first and second ends, the core including:
        a first sidewall between the first and second ends, the first sidewall with a first grating profile defined by a first periodic grating structure, the first grating profile having a first phase shift distributed between the first and second ends; and
        a second sidewall opposite the first sidewall, the second sidewall between the first and second ends, the second sidewall with a second grating profile defined by a second periodic grating structure, the second grating profile having a second phase shift distributed between the first and second ends of the core; and
    a cladding disposed around the core;
    wherein the first grating profile is apodized such that the first periodic grating structure has a non-uniform amplitude between the first and second ends.

2. The optical structure of claim 1 wherein:
the core includes lithium niobate; and
the cladding includes silicon dioxide.

3. The optical structure of claim 1 wherein the first grating profile includes a sinusoidal grating profile.

4. The optical structure of claim 1 wherein the first phase shift is 180° of a spatial wavelength of the first grating profile.

5. The optical structure of claim 1 wherein the first grating profile has one half of the first phase shift distributed between the first end of the core and a midpoint between the first and second ends of the core, and has another half of the first phase shift distributed between the midpoint and the second end of the core.

6. The optical structure of claim 1 wherein the first phase shift is distributed linearly between the first and second ends of the core.

7. The optical structure of claim 1 wherein the second grating profile is apodized such that the second periodic grating structure has a non-uniform amplitude between the first and second ends of the core.

8. The optical structure of claim 1 wherein the first and second periodic grating structures are configured to produce a pi phase shift in an optical signal propagating in the optical structure, such that the optical structure is configured to be a Bragg resonator.

9. The optical structure of claim 1 wherein:
a peak-to-peak amplitude of the first grating profile decreases from the first end of the core to an abrupt-phase-change cross section of the core; and
the peak-to-peak amplitude of the first grating profile increases from the abrupt- phase-change cross section to the second end of the core.

10. A electro-optic modulator, comprising:
an optical structure, including:
a core having first and second ends, the core comprising:
a first sidewall between the first and second ends, the first sidewall with a first grating profile defined by a first periodic grating structure, the first grating profile having a first phase shift distributed between the first and second ends, and
a second sidewall opposite the first sidewall, the second sidewall between the first and second ends, the second sidewall with a second grating profile defined by a second periodic grating structure, the second grating profile having a second phase shift distributed between the first and second ends; and
a cladding disposed around the core;
a first electrode disposed adjacent to the first sidewall of the core; and
a second electrode disposed adjacent to the second sidewall of the core, the second sidewall being opposite the first sidewall;
wherein at least one of the first and second grating profiles is apodized such that at least one of the first and second periodic grating structures has a non-uniform amplitude between the first and second ends of the core.

11. The electro-optic modulator of claim 10 wherein the first and second periodic grating structures are configured to produce a pi phase shift in an optical signal propagating in the optical structure, such that the optical structure is configured to be a Bragg resonator.

12. The electro-optic modulator of claim 11 wherein:
the second grating profile is approximately the same as the first grating profile;
the second phase shift is approximately the same as the first phase shift; and
the second phase shift is distributed between the first and second ends in a manner similar to a manner in which the first phase shift is distributed between the first and second ends.

13. The electro-optic modulator of claim 11 wherein first and second phase shifts are each distributed approximately uniformly between the respective first and second ends.

14. The electro-optic modulator of claim 10 wherein:
the optical structure is configured to resonate at an optical frequency in response to a first voltage between the first and second electrodes; and
the optical structure is configured to attenuate an optical signal at the optical frequency in response to a second voltage between the first and second electrodes.

15. The electro-optic modulator of claim 10, wherein the core comprises:
a first reflector disposed at the first end and configured to impart the first phase shift to an optical signal propagating in the optical structure; and
a second reflector disposed at the second end and configured to impart the second phase shift to the optical signal;
wherein a combination of the first reflector and the second reflector is configured to resonate at an optical wavelength in response to a sum of the phase shifts equaling 360° of the optical wavelength.

16. The electro-optic modulator of claim 10, wherein the core comprises:
a first Bragg reflector disposed at the first end and configured to impart, to an optical signal propagating in the optical structure, a phase shift of approximately 180° of a spatial wavelength of the first and second grating profiles; and
a second Bragg reflector disposed at the second end and configured to impart, to the optical signal, a phase shift of approximately 180° of the spatial wavelength of the first and second grating profiles.

17. The electro-optic modulator of claim 10 wherein:
a peak-to-peak amplitude of at least one of the first and second grating profiles decreases from the first end of the core to an abrupt-phase-change cross section of the core; and
the peak-to-peak amplitude of the at least one of the first and second grating profiles increases from the abrupt-phase-change cross section to the second end of the core.

* * * * *